S. P. WEBBER.
Coffee-Pot.
No. 163,426.　　　　　　　　　　Patented May 18, 1875.
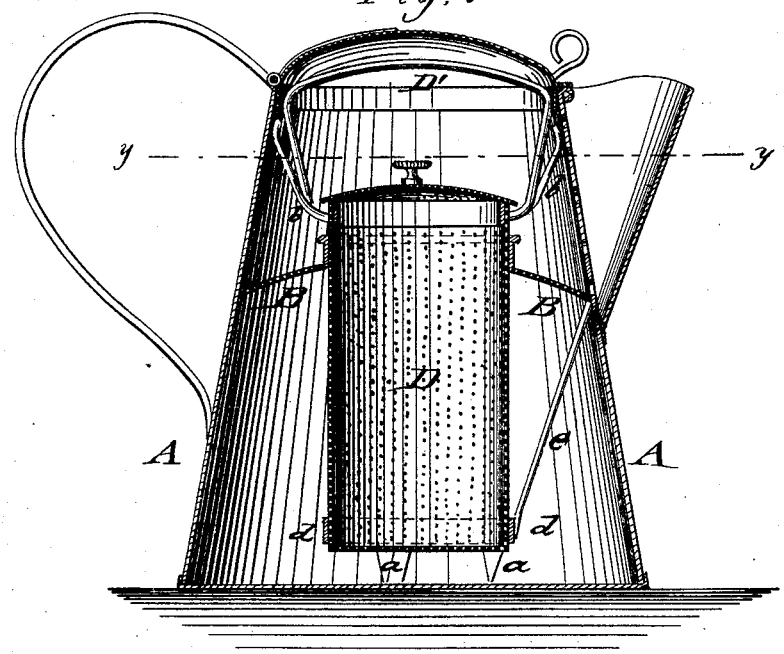
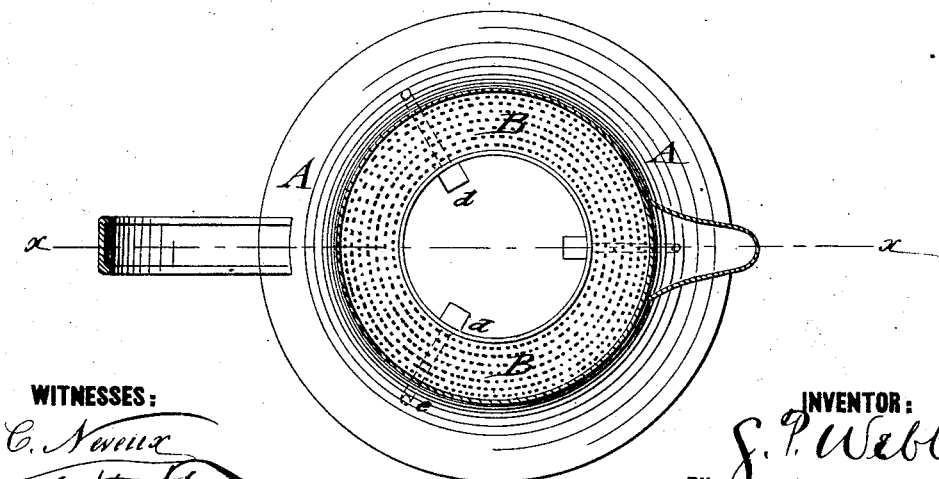

UNITED STATES PATENT OFFICE.

SUMNER P. WEBBER, OF CHARLOTTE, MICHIGAN.

IMPROVEMENT IN COFFEE-POTS.

Specification forming part of Letters Patent No. 163,426, dated May 18, 1875; application filed April 10, 1875.

*To all whom it may concern:*

Be it known that I, SUMNER P. WEBBER, of Charlotte, in the county of Eaton and State of Michigan, have invented a new and Improved Coffee-Pot, of which the following is a specification:

In the accompanying drawing, Figure 1 represents a vertical central section of my improved coffee-pot on the line $x\,x$, Fig. 2; Fig. 2 a horizontal section of the same on line $y\,y$, Fig. 1; and Fig. 3 a vertical central section of the supplementary top for the stationary strainer of the pot.

Similar letters of reference indicate corresponding parts.

My invention relates to an improved coffee-pot in which the ground coffee is exposed to the action of the boiling water in a detachable coarse strainer and produced in a perfectly clear state by passing through an interior stationary strainer of the pot.

My invention consists of a coffee-pot with a cylindrical coarse strainer that is fitted securely into an annular finer strainer, arranged below the spout at the inside of the pot, the detachable strainer being supported at some distance at the bottom of the pot and retained by springs at the top, a bail serving to lift it out of the pot.

In the drawing, A represents a coffee-pot of the usual shape and material, which is provided at the inside below the spout with an annular strainer, B, of fine reticulated sheet metal or wire gauze, the central opening of which is closed after the coffee has been steeped and its strength extracted by a cover, C, of finely-perforated material. The opening of the strainer B serves also to support the detachable strainer D, fitting therein and containing the ground coffee. The strainer D is made of cylindrical shape and of coarser reticulated sheet metal or wire gauze than the surrounding stationary strainer, and is introduced into the pot by a top bail, D'. The lid and bottom of detachable strainer D are also perforated, and the latter provided with legs $a$ for keeping the strainer at some distance from the bottom of the pot and admitting the free entering of the boiling water through the coarser perforations of the strainer so as to soak the coffee thoroughly and extract its strength. The strainer D is retained in position by top wire springs $b$, which bind on the inside of the pot and prevent the strainer from changing its position when pouring out the coffee. The bottom of strainer D may be furthermore supported, if desired, by a base-holding recessed ring, $d$, soldered to the bottom of the pot and to side braces $e$, as shown in the drawing.

When the coffee is made the detachable strainer is removed and the additional top or lid inserted. Any particles of ground coffee which may have escaped in boiling from the main strainer, are, in pouring out, retained by the finer stationary strainer, so that a clear coffee, free from all impurities, is obtained without any extra straining devices.

Having thus described my invention, I claim as new and desire to secure by Letters Patent—

The combination of a coffee-pot having an annular stationary strainer at the inside below the spout, with a detachable coarser strainer for the ground coffee fitted therein and retained at some distance from the bottom by legs and at the top by wire springs, substantially as set forth.

SUMNER P. WEBBER.

Witnesses:
N. S. PHILLIPS,
D. F. WEBBER.